(12) United States Patent
Fu et al.

(10) Patent No.: US 12,032,424 B2
(45) Date of Patent: Jul. 9, 2024

(54) FILTERING-BASED POWER SUPPLY APPARATUS, POWER SOURCING EQUIPMENT, AND POWER SUPPLY SYSTEM

(71) Applicant: Huawei Technologies Co., Ltd., Shenzhen (CN)

(72) Inventors: Shiyong Fu, Shenzhen (CN); Houcun Zhu, Nanjing (CN); Donghui Wang, Nanjing (CN); Xiangen Xu, Nanjing (CN); Zhaojin Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/850,019

(22) Filed: Jun. 27, 2022

(65) Prior Publication Data

US 2022/0329449 A1  Oct. 13, 2022

Related U.S. Application Data

(63) Continuation of application No. PCT/CN2020/137818, filed on Dec. 19, 2020.

(30) Foreign Application Priority Data

Dec. 28, 2019  (CN) .......................... 201911384784.1

(51) Int. Cl.
*G06F 1/3209* (2019.01)
*H02J 1/02* (2006.01)

(52) U.S. Cl.
CPC .............. *G06F 1/3209* (2013.01); *H02J 1/02* (2013.01)

(58) Field of Classification Search
CPC .......... G06F 1/3209; G06F 1/26; G06F 1/266; G01R 27/20; G01R 31/00; H04L 12/10; H02J 1/02
USPC ........................................................ 713/300
See application file for complete search history.

(56) References Cited

U.S. PATENT DOCUMENTS 8,543,008 B2 *  9/2013  Soto ........................ H04B 10/27
                                              398/171
10,466,768 B2   11/2019  Fu et al.
11,349,676 B2 *  5/2022  Wendt ....................... G06F 1/26
(Continued)

FOREIGN PATENT DOCUMENTS

CN      201294537 Y  *  8/2009
CN      201294537 Y     8/2009
(Continued)

*Primary Examiner* — Chun Cao
(74) *Attorney, Agent, or Firm* — Conley Rose, P.C.

(57) ABSTRACT

A filtering-based power supply apparatus used in a power sourcing equipment (PSE) includes a power supply control circuit and an adaptive filter circuit. The power supply control circuit includes a power supply channel and a detection module. The power supply channel includes a control switch configured to control on and off of the power supply channel. The detection module is configured to send a detection signal to the power supply channel to detect whether a peer device connected to the power supply channel is a valid powered device. The control switch is turned off in a detection process of the power supply channel. The adaptive filter circuit is configured to filter noise in the detection signal in the detection process of the power supply channel.

20 Claims, 9 Drawing Sheets

(56) References Cited

U.S. PATENT DOCUMENTS

| | | | |
|---|---|---|---|
| 2008/0005602 A1* | 1/2008 | Diab | ............ G06F 1/266 |
| | | | 713/300 |
| 2011/0029790 A1 | 2/2011 | Maniktala | |
| 2011/0113276 A1* | 5/2011 | Diab | ............ H04L 12/10 |
| | | | 713/340 |
| 2017/0104604 A1* | 4/2017 | Liu | ............ H04L 12/40045 |
| 2018/0139064 A1 | 5/2018 | Tarn et al. | |

FOREIGN PATENT DOCUMENTS

| | | | | |
|---|---|---|---|---|
| CN | 105610586 A | | 5/2016 | |
| CN | 105634750 A | * | 6/2016 | ............ G06F 1/266 |
| CN | 105634750 A | | 6/2016 | |
| CN | 208424392 U | | 1/2019 | |
| EP | 3160079 A1 | | 4/2017 | |
| EP | 3565180 A1 | | 11/2019 | |
| WO | 2018157300 A1 | | 9/2018 | |

* cited by examiner

FILTERING-BASED POWER SUPPLY APPARATUS, POWER SOURCING EQUIPMENT, AND POWER SUPPLY SYSTEM

CROSS-REFERENCE TO RELATED APPLICATIONS

This is continuation of International Patent Application No. PCT/CN2020/137818 filed on Dec. 19, 2020, which claims priority to Chinese Patent Application No. 201911384784.1 filed on Dec. 28, 2019. The disclosures of the aforementioned applications are hereby incorporated by reference in their entireties.

TECHNICAL FIELD

This relates to the communications field, and in particular, to a filtering-based power supply apparatus, a power sourcing equipment (PSE), and a power supply system.

BACKGROUND

Power over Ethernet (PoE) is a technology of simultaneously transmitting Ethernet data and power by using an Ethernet twisted pair. The power refers to provided electricity. APoE device defined in the PoE standard released by the Institute of Electrical and Electronics Engineers (IEEE) includes a PSE and a powered device (PD). The PSE communicates with the PD and provides power for the PD through an Ethernet twisted pair. The PSE provides power. The PD extracts power.

The Ethernet twisted pair, also referred to as an Ethernet cable, usually includes eight cables. A cable 1 and a cable 2 are paired, and are referred to as a cable pair 1-2. A cable 3 and a cable 6 are paired, and are referred to as a cable pair 3-6. A cable 4 and a cable 5 are paired, and are referred to as a cable pair 4-5. A cable 7 and a cable 8 are paired, and are referred to as a cable pair 7-8. Two paired cables are twisted together. In a widely used 100 M Ethernet, the cable pair 1-2 and the cable pair 3-6 are used for communication, and the cable pair 4-5 and the cable pair 7-8 are idle.

At first, PoE generally uses two cable pairs, such as the cable pair 1-2 and the cable pair 3-6, to supply power, which can provide up to 30 watts (W) of power. With the development of the PoE technology, new high-power PoE uses all four cable pairs to supply power simultaneously, which can provide up to 90 W of power.

Because of convenience of use, the PoE technology is increasingly widely used, and scenarios of use are also increasingly complex. It can be used in indoor scenarios, such as equipment rooms, weak current wells, and corridors, and outdoor scenarios, such as building walls. However, many scenarios cannot ensure that the PSE is well grounded. When the PSE is poorly grounded, once an impedance to ground of the PD is less than an impedance to ground of the PSE, a common mode interference signal on the PSE is transmitted to the PD through an Ethernet twisted pair for leakage, which affects detection of the PD by the PSE. As a result, the detection fails, and the PD cannot be powered on (the PSE does not supply power to the PD). The common mode interference signal on the PSE is noise from a power supply when the PSE is connected to a power grid, and is also referred to as power supply noise or common mode noise.

SUMMARY

This disclosure provides a filtering-based power supply apparatus, a PSE, and a power supply system. By disposing a filter in a PSE to filter noise from a power supply, the following problem can be resolved: The noise from the power supply in the PSE is transmitted to a PD by using a twisted pair for leakage, and as a result, detection of the PD by the PSE fails and the PD cannot be powered on.

According to a first aspect, a filtering-based power supply apparatus is provided and is used in a PSE. The filtering-based power supply apparatus includes a power supply control circuit and an adaptive filter circuit. The power supply control circuit includes a first power supply channel and a first detection module. The first power supply channel includes a first control switch, and the first control switch is configured to control on and off of the first power supply channel. The first detection module is configured to send a first detection signal to the first power supply channel, so as to detect whether a peer device connected to the first power supply channel is a valid powered device. The first control switch is turned off in a detection process of the first power supply channel. A first input terminal of the adaptive filter circuit is connected to the first detection module, and a first output terminal of the adaptive filter circuit is connected to an output terminal of the first power supply channel.

The adaptive filter circuit is configured to filter noise in the first detection signal in the detection process of the first power supply channel.

With reference to the first aspect, in a first possible implementation of the first aspect, the adaptive filter circuit includes a first filter. The first filter is connected in series between the first input terminal and the first output terminal of the adaptive filter circuit; and the first filter is configured to filter the noise in the first detection signal in the detection process, and the first filter is connected to the first detection module.

With reference to the first possible implementation of the first aspect, in a second possible implementation of the first aspect, the adaptive filter circuit further includes a first selector switch. The first selector switch corresponds to the first power supply channel.

A first terminal of the first selector switch is connected to the first input terminal of the adaptive filter circuit, a second terminal of the first selector switch is connected to the first filter, and a third terminal of the first selector switch is connected to the first output terminal of the adaptive filter circuit. For example, a single pole double throw switch is the first selector switch. A pole terminal of the first selector switch is connected to the first input terminal of the adaptive filter circuit, a first throw terminal of the first selector switch is connected to a terminal of the first filter, a second throw terminal of the first selector switch is connected to the first output terminal of the adaptive filter circuit, and another terminal of the first filter is connected to the first output terminal of the adaptive filter circuit.

The first selector switch is configured to turn on the first terminal and the second terminal (the pole terminal and the first throw terminal) based on a first control instruction, to turn on the first input terminal of the adaptive filter circuit, the first filter, and the first output terminal of the adaptive filter circuit, so that the first filter filters the noise in the first detection signal.

The first selector switch is further configured to turn on the first terminal and the third terminal (the pole terminal and the second throw terminal) based on a second control instruction, so that the first input terminal of the adaptive filter circuit is directly connected to the first output terminal of the adaptive filter circuit, to filter the noise in the first detection signal without using a filter.

With reference to the second possible implementation of the first aspect, in a third possible implementation of the first aspect, the power supply control circuit further includes a controller. The controller is configured to send the first control instruction or the second control instruction to the first selector switch. With reference to the first aspect and the first possible implementation to the third possible implementation of the first aspect, in a fourth possible implementation of the first aspect, the adaptive filter circuit may be disposed before, after, or in the first detection module. The first input terminal of the adaptive filter circuit is connected to an output terminal of the first detection module, and the first output terminal of the adaptive filter circuit is connected to the output terminal of the first power supply channel; or the first input terminal of the adaptive filter circuit is connected to a power supply, and the first output terminal of the adaptive filter circuit is connected to an input terminal of the first detection module; or the adaptive filter circuit is located in the first detection module, that is, the first filter, or the first filter and the first selector switch are disposed in the first detection module.

With reference to the first aspect, in a fifth possible implementation of the first aspect, the power supply control circuit further includes a second power supply channel and a second detection module.

The second power supply channel includes a second control switch, where the second control switch is configured to control on and off of the second power supply channel.

The second detection module is configured to send a second detection signal to the second power supply channel, so as to detect whether a peer device connected to the second power supply channel is a valid powered device. The second control switch is turned off in a detection process of the second power supply channel.

The adaptive filter circuit is further configured to filter noise in the second detection signal in the detection process of the second power supply channel.

With reference to the fifth possible implementation of the first aspect, in a sixth possible implementation of the first aspect, the adaptive filter circuit includes a first filter and a second filter, the first filter corresponds to the first power supply channel, and the second filter corresponds to the second power supply channel.

The first filter is connected in series between a first input terminal and a first output terminal of the adaptive filter circuit. The second filter is connected in series between a second input terminal and a second output terminal of the adaptive filter circuit.

The first filter is configured to filter the noise in the first detection signal in the detection process of the first power supply channel.

The second filter is configured to filter the noise in the second detection signal in the detection process of the second power supply channel.

In this possible implementation, the first filter may be disposed between the first detection module and the output terminal of the first power supply channel, or may be disposed in the first detection module. The second filter may be disposed between the second detection module and an output terminal of the second power supply channel, or may be disposed in the second detection module.

With reference to the sixth possible implementation of the first aspect, in the seventh possible implementation of the first aspect, the adaptive filter circuit further includes a first selector switch and a second selector switch, the first selector switch corresponds to the first power supply channel, and the second selector switch corresponds to the second power supply channel.

A first terminal of the first selector switch is connected to the first input terminal of the adaptive filter circuit, a second terminal of the first selector switch is connected to the first filter, and a third terminal of the first selector switch is connected to the first output terminal of the adaptive filter circuit. For example, a single pole double throw switch is the first selector switch. A pole terminal of the first selector switch is connected to the first input terminal of the adaptive filter circuit, a first throw terminal of the first selector switch is connected to a terminal of the first filter, a second throw terminal of the first selector switch is connected to the first output terminal of the adaptive filter circuit, and another terminal of the first filter is connected to the first output terminal of the adaptive filter circuit.

A first terminal of the second selector switch is connected to the second input terminal of the adaptive filter circuit, a second terminal of the second selector switch is connected to the second filter, and a third terminal of the second selector switch is connected to the second output terminal of the adaptive filter circuit. For example, a single pole double throw switch is the second selector switch. A pole terminal of the second selector switch is connected to the second input terminal of the adaptive filter circuit, a first throw terminal of the second selector switch is connected to a terminal of the second filter, a second throw terminal of the second selector switch is connected to the second output terminal of the adaptive filter circuit, and another terminal of the second filter is connected to the second output terminal of the adaptive filter circuit.

The first selector switch is configured to turn on the first terminal and the second terminal of the first selector switch based on a first control instruction, and turn on the first input terminal of the adaptive filter circuit, the first filter, and the first output terminal of the adaptive filter circuit, to filter the noise in the first detection signal by using the first filter; and is further configured to turn on the first terminal and the third terminal of the first selector switch based on a second control instruction, so that the first input terminal of the adaptive filter circuit is directly connected to the first output terminal of the adaptive filter circuit, so as to filter the noise without using the first filter.

The second selector switch is configured to turn on the first terminal and the second terminal of the second selector switch based on the first control instruction, and turn on the second input terminal of the adaptive filter circuit, the second filter, and the second output terminal of the adaptive filter circuit, to filter the noise in the second detection signal by using the second filter. The second selector switch is further configured to turn on the first terminal and the third terminal of the second selector switch based on the second control instruction, so that the second input terminal of the adaptive filter circuit is directly connected to the second output terminal of the adaptive filter circuit, so as to filter the noise without using the second filter.

With reference to the fifth possible implementation of the first aspect, in an eighth possible implementation of the first aspect, the adaptive filter circuit includes a common filter and a common selector switch.

A first input terminal of the adaptive filter circuit is connected to an output terminal of the first detection module, and a first output terminal of the adaptive filter circuit is connected to an output terminal of the first power supply channel. A second input terminal of the adaptive filter circuit is connected to an output terminal of the second detection module, and a second output terminal of the adaptive filter circuit is connected to an output terminal of the second power supply channel.

The common filter and the common selector switch are connected in series between an input terminal and an output terminal of the adaptive filter circuit. A first pole terminal of the common selector switch is connected to a first terminal of the common filter, and a second pole terminal of the common selector switch is connected to a second terminal of the common filter. A first throw terminal of the common selector switch is connected to the first input terminal of the adaptive filter circuit, and a second throw terminal of the common selector switch is connected to the second input terminal of the adaptive filter circuit. A third throw terminal of the common selector switch is connected to the first output terminal of the adaptive filter circuit. A fourth throw terminal of the common selector switch is connected to the second output terminal of the adaptive filter circuit.

The common selector switch is configured to turn on the first pole terminal and the first throw terminal as well as the second pole terminal and the third throw terminal based on a first selection instruction, and turn on the first detection module, the common filter, and the output terminal of the first power supply channel, to filter the noise in the first detection signal by using the common filter.

The common selector switch is further configured to turn on the first pole terminal and the second throw terminal as well as the second pole terminal and the fourth throw terminal based on a second selection instruction, and turn on the second detection module, the common filter, and the output terminal of the second power supply channel, to filter the noise in the second detection signal by using the common filter.

With reference to the eighth possible implementation of the first aspect, in a ninth possible implementation of the first aspect, the power supply control circuit further includes a controller. The controller is configured to send the first selection instruction and the second selection instruction to the common selector switch.

According to a second aspect, a PSE is provided, including at least one port, and the filtering-based power supply apparatus according to any one of the first aspect and the implementations thereof, where the f filtering-based power supply apparatus is configured to perform detection on the at least one port.

According to a third aspect, a power supply system is provided, including a powered device and a PSE, where the PSE includes the filtering-based power supply apparatus according to any one of the first aspect and the implementations thereof. The powered device is connected to the PSE by using a twisted pair.

According to a fourth aspect, a chip is provided, comprising a programmable logic circuit and/or instructions, and the filtering-based power supply apparatus according to any one of the first aspect and the implementations thereof is implemented when the chip runs.

DESCRIPTION OF EMBODIMENTS

Figure 1:
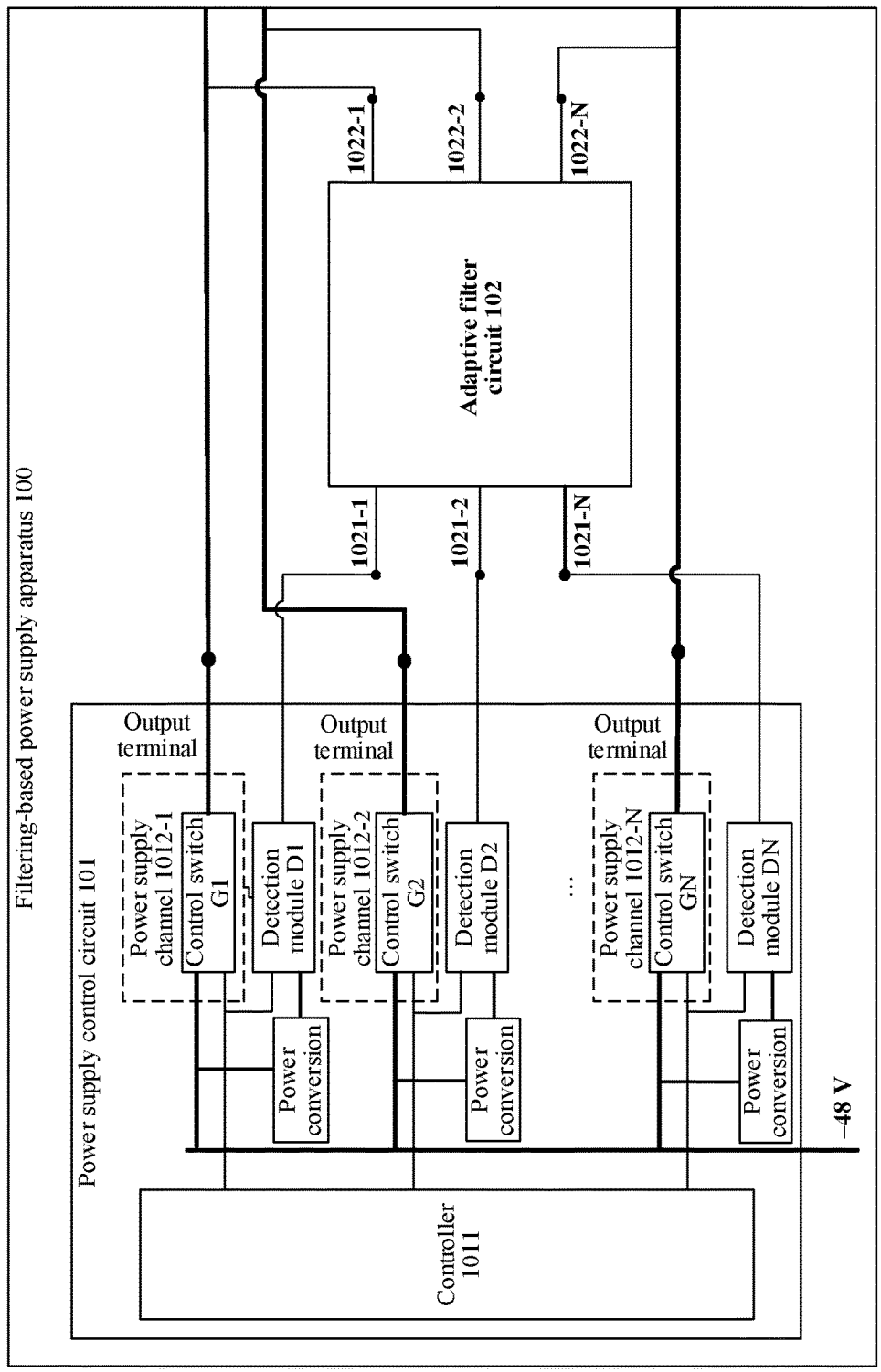
FIG. 1 is a schematic diagram of a structure of a filtering-based power supply apparatus according to an embodiment of this disclosure.

The following describes technical solutions provided in this disclosure with reference to the accompanying drawings and implementations.

Before supplying power to an Ethernet port, a PSE first performs a detection process to detect whether a peer device connected to the Ethernet port is a valid PD. The PSE sends a detection signal to the peer device along a twisted pair, measures an impedance of the peer device, and determines, based on a measured impedance, whether the peer device is a valid PD. If the measured impedance is within an impedance range of the valid powered device, it is considered that the peer device is a PD, and the PSE supplies power to the peer device. If the measured impedance is not within the impedance range of the valid powered device, it is considered that the peer device is not a PD, and the PSE is not to supply power to the peer device.

The detection signal is classified into a voltage type and a current type. The voltage type involves a constant voltage source, and a detection signal sent to the peer device along the twisted pair is a detection voltage. The current type involves a constant current source, and a detection signal sent to the peer device along the twisted pair is a detection current. However, regardless of whether a detection signal is a voltage type or a current type, there is noise from a power supply in the detection signal. In a scenario in which the PSE is poorly grounded, if an impedance to ground of the PD is less than an impedance to ground of the PSE, the noise from the power supply in the detection signal is transmitted to the PD by using the twisted pair for leakage, and as a result, the impedance detected by the PSE is not within the impedance range of the valid powered device, and the PD cannot be powered on normally.

Therefore, this disclosure provides a filtering-based power supply apparatus used in a PSE. The filtering-based power supply apparatus includes a power supply control circuit and an adaptive filter circuit. The power supply control circuit includes N power supply channels and N detection modules one-to-one corresponding to the N power supply channels; where N is a positive integer. Each power supply channel includes one control switch, configured to control on and off of the power supply channel on which the control switch is located. The adaptive filter circuit is configured to filter, in a detection process, noise in a detection signal generated by each detection module. In the detection process, a control switch in each power supply channel is in an off state. If it is determined through detection that a power supply channel is connected to a valid PD, a control switch that controls the power supply channel is closed, to turn on the power supply channel to supply power to the connected valid PD. The filtering-based power supply apparatus according to this disclosure eliminates impact of the noise in the detection signal by adding a filter circuit to the PSE, thereby solving a problem that a detection error occurs when the PSE is poorly grounded, and a PD cannot be powered on normally.

In a conventional power supply control circuit, an input terminal of a detection module is directly connected to a power supply, and is connected to a power conversion module. An output terminal of the detection module is directly connected to an output terminal of a power supply channel, that is, a power supply port. The power conversion module is configured to convert a power supply (for example, −48 volts (V)) into a constant current source or a constant voltage source required by the detection module. In this embodiment of this disclosure, the adaptive filter circuit added to the filtering-based power supply apparatus may be disposed before the detection module, after the detection module, or in the detection module. The adaptive filter circuit may be disposed between an output terminal of the detection module and an output terminal (that is, a power supply port) of the power supply channel. Alternatively, the adaptive filter circuit may be disposed between a power supply (disposed in a power conversion module) and the detection module. Alternatively, the adaptive filter circuit may be disposed in the detection module, and a detection signal is sent to the power supply port after noise is filtered by the adaptive filter circuit.

FIG. 1 is a schematic diagram of a structure of a filtering-based power supply apparatus according to an embodiment of this disclosure. As shown in FIG. 1, the filtering-based power supply apparatus 100 includes: a power supply control circuit 101 and an adaptive filter circuit 102.

The power supply control circuit 101 includes a controller 1011, N power supply channels (1012-1 to 1012-N), and N detection modules, where N is a positive integer. Each power supply channel includes one control switch, configured to turn on or turn off the power supply channel in which the control switch is located. One detection module is correspondingly disposed for each power supply channel.

Each detection module is configured to send a detection signal to a corresponding power supply channel, so as to detect whether a peer device connected to the power supply channel is a valid powered device.

The adaptive filter circuit 102 includes N input terminals (1021-1 to 1021-N) and N output terminals (1022-1 to 1022-N). The adaptive filter circuit 102 is configured to filter noise in the detection signal in a detection process. A control switch in a power supply channel is in an off state in a detection process of the power supply channel.

The N input terminals (1021-1 to 1021-N) of the adaptive filter circuit 102 are respectively connected to output terminals of detection modules of the N power supply channels (1012-1 to 1012-N), and the N output terminals (1022-1 to 1022-N) of the adaptive filter circuit 102 are respectively connected to output terminals of the N power supply channels (1012-1 to 1012-N).

For example, in FIG. 1, 1021-1 is connected to a detection module D1 of 1012-1, 1021-2 is connected to a detection module D2 of 1012-2, . . . , and 1021-N is connected to a detection module DN of 1012-N. 1022-1 is connected to an output terminal of 1012-1, 1022-2 is connected to an output terminal of 1012-2, . . . , and 1022-N is connected to an output terminal of 1012-N.

An input terminal of each detection module is connected to a power conversion module, and the power conversion module converts a power supply (for example, −48 V) into a constant current source or a constant voltage source required by the detection module. The power conversion module may be implemented by using a direct current-to-direct current converter (DC-to-DC converter) (often represented by DC/DC). The power conversion module may alternatively be implemented by using a low dropout regulator (LDO). In an implementation, only one power conversion module or a plurality of power conversion modules may be disposed for all detection modules, and this is not limited in this disclosure. In FIG. 1, that one power conversion module is correspondingly disposed for each detection module is used as an example.

In a possible implementation, the power supply control circuit 101 is implemented by using a PSE chip.

In another possible implementation, the power supply control circuit 101 includes a PSE chip and N control switches. A quantity of control switches is the same as a quantity of power supply channels in the PSE chip. Each power supply channel corresponds to one control switch. For example, as shown in FIG. 1, the power supply channel 1012-1 corresponds to a control switch G1, the power supply channel 1012-2 corresponds to a control switch G2, . . . , and the power supply channel 1012-N corresponds to a control switch GN. The PSE chip outputs a control signal to control on or off of each control switch.

The control switch may be implemented by using a relay, an optical coupler, a metal-oxide-semiconductor field-effect transistor (MOSFET), or a transistor. The control switch is turned on or off based on the control signal output by the controller 1011.

When N is 1, the foregoing PSE chip is generally referred to as a single-channel PSE chip. When N is greater than 1, the foregoing PSE chip is generally referred to as a multi-channel PSE chip.

Figure 2:
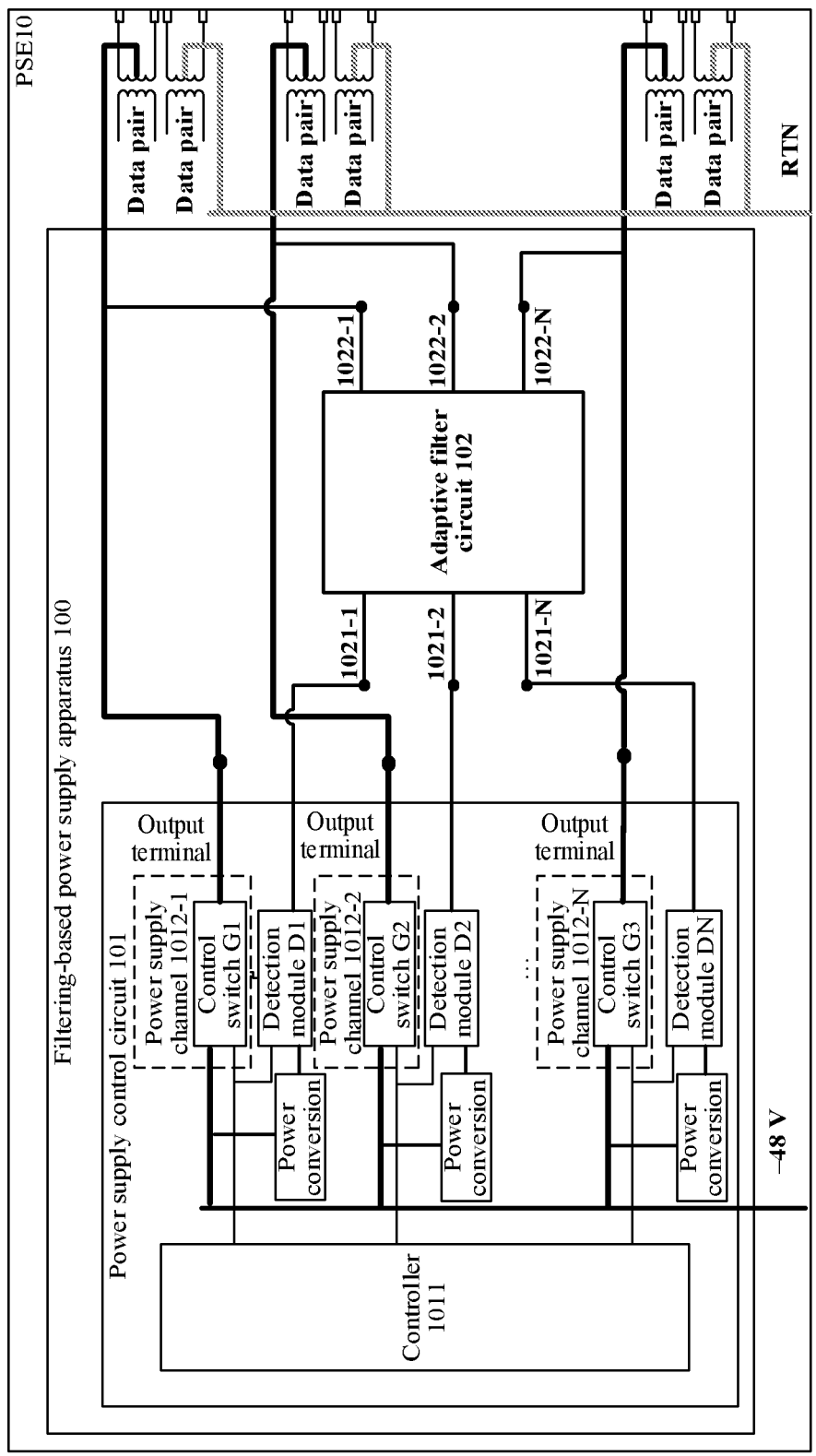
FIG. 2 is a schematic diagram of a structure of PSE according to an embodiment of the present disclosure.

As shown in FIG. 2, the filtering-based power supply apparatus 100 may be disposed in a PSE 10.

Corresponding to Ethernet cables, one Ethernet port generally includes eight contacts, numbered 1 to 8, which are respectively used to connect to cables 1 to 8 in the Ethernet cables. The contact 1 and the contact 2 are paired, referred to as a contact pair 1-2, which is configured to connect to a cable pair 1-2 of the Ethernet cables. The contact 3 and the contact 6 are paired, referred to as a contact pair 3-6, which is configured to connect to a cable pair 3-6 of the Ethernet cables. The contact 4 and the contact 5 are paired, referred to as a contact pair 4-5, which is configured to connect to a cable pair 4-5 of the Ethernet cables. The contact 7 and the contact 8 are paired, referred to as a contact pair 7-8, which is configured to connect to a cable pair 7-8 of the Ethernet cables. The Ethernet port is divided into two contact groups, where a first contact group includes the contact pair 1-2 and the contact pair 3-6, and a second contact group includes the contact pair 4-5 and the contact pair 7-8.

Alternative A and Alternative B for supplying power by using two cable pairs are defined in the PoE standard. Alternative A supplies power by using the cable pair 1-2 and the cable pair 3-6, that is, Alternative A supplies power by using the first contact group of the Ethernet port. Alternative B supplies power by using the cable pair 4-5 and the cable pair 7-8, that is, Alternative B supplies power by using the second contact group of the Ethernet port. When the filtering-based power supply apparatus according to this embodiment of this disclosure is used in a power supply scenario using two cable pairs, if the first contact group of the Ethernet port is used to supply power, that is, Alternative A is used, the first contact group is referred to as a power supply contact group; and if the second contact group of the Ethernet port is used to supply power, that is, Alternative B is used, the second contact group is referred to as a power supply contact group. When the filtering-based power supply apparatus according to this embodiment of this disclosure is used in a power supply scenario using four cable pairs, that is, when the first contact group and the second contact group of the Ethernet port are used to supply power together, the first contact group and the second contact group of the Ethernet port are both referred to as power supply contact groups.

The PSE 10 may include N power supply contact groups corresponding to the filtering-based power supply apparatus 100. The output terminals of the N power supply channels in the filtering-based power supply apparatus 100 are respectively connected to the N power supply contact groups. Certainly, the PSE 10 may alternatively include more than or less than N power supply contact groups. When there are less than N power supply contact groups, some power supply channels of the filtering-based power supply apparatus 100 are idle; and when there are more than N power supply contact groups, the PSE 10 may further include another power supply apparatus.

The PSE 10 includes a first Ethernet port connected to the filtering-based power supply apparatus 100.

When N is 1, if one power supply channel of the filtering-based power supply apparatus 100 is connected to a first contact group of the first Ethernet port, the first contact group is a power supply contact group; or if one power supply channel of the f filtering-based power supply apparatus 100 is connected to a second contact group of the first Ethernet port, the second contact group is a power supply contact group.

When N is 2, if two power supply channels of the filtering-based power supply apparatus 100 may be connected to a first contact group and a second contact group of the first Ethernet port, the first contact group and the second contact group of the first Ethernet port are both power supply contact groups; or the PSE 10 further includes a second Ethernet port. In the two power supply channels of the filtering-based power supply apparatus 100, one power supply channel may be connected to the first contact group of the first Ethernet port, and the other power supply channel is connected to a first contact group of the second Ethernet port. Alternatively, in the two power supply channels of the filtering-based power supply apparatus 100, one power supply channel may be connected to the second contact group of the first Ethernet port, and the other power supply channel is connected to a second contact group of the second Ethernet port.

When N is greater than 2, this may be implemented in any combination manner of the foregoing implementations in which N is 1 and N is 2. For example, when N is 4, the filtering-based power supply apparatus 100 includes four power supply channels. It is assumed that the filtering-based power supply apparatus 100 is connected to four Ethernet ports, and each power supply channel is connected to a first contact group of one Ethernet port respectively, or each power supply channel is connected to a second contact group of one Ethernet port respectively, to implement power supplying using two cable pairs. Alternatively, it is assumed that the filtering-based power supply apparatus 100 is connected to two Ethernet ports, and each Ethernet port is connected to two power supply channels, to implement power supplying using four cable pairs. Alternatively, it is assumed that the filtering-based power supply apparatus 100 is connected to three Ethernet ports, where a power supply channel 1 is connected to a first contact group of a first Ethernet port, a power supply channel 2 is connected to a first contact group of a second Ethernet port, and a power supply channel 3 and a power supply channel 4 are connected to a first contact group and a second contact group of a third Ethernet port.

Each power supply channel may further include one overload current detection module (not shown in FIG. 1 and FIG. 2), configured to detect whether a current on the power supply channel in a power supply process exceeds a maximum power supply current specified in the standard. In the power supply process, a control switch in the power supply channel is closed.

The PSE 10 in this embodiment of this disclosure shows only modules or components related to this disclosure. It may be understood that the PSE 10 may further include another component, such as a processor, a memory, a physical layer (PHY) chip, another hardware chip, and the like.

The following describes in detail a possible implementation of the filtering-based power supply apparatus based on the filtering-based power supply apparatus shown in FIG. 1 and FIG. 2. For details, refer to filtering-based power supply apparatuses shown in FIG. 3 to FIG. 5.

Figure 3:
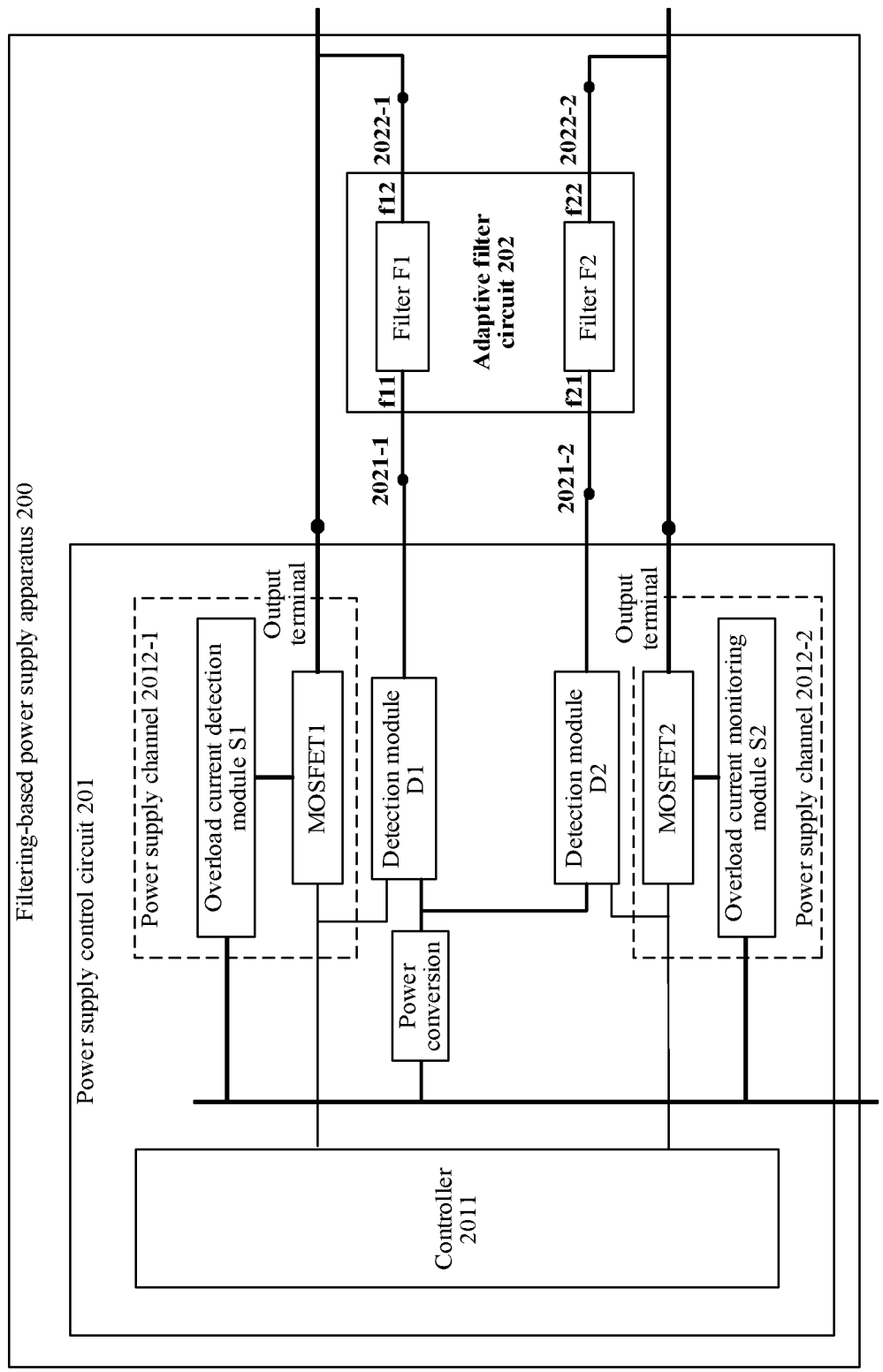
FIG. 3 is a schematic diagram of a structure of another filtering-based power supply apparatus according to an embodiment of this disclosure.

FIG. 3 is a schematic diagram of a structure of another filtering-based power supply apparatus according to an embodiment of this disclosure. As shown in FIG. 3, a filtering-based power supply apparatus 200 includes a power supply control circuit 201 and an adaptive filter circuit 202. The power supply control circuit 201 includes a controller 2011, a first power supply channel 2012-1, a second power supply channel 2012-2, a detection module D1, and a detection module D2. The first power supply channel 2012-1 includes an overload current detection module S1 and a control switch MOSFET1, and the second power supply channel 2012-2 includes an overload current detection module S2 and a control switch MOSFET2. In FIG. 3, that a MOSFET is used to implement the control switch is used as an example, and this imposes no limitation on the control switch in this disclosure.

The detection module D1 is configured to send a first detection signal to the first power supply channel 2012-1 in a detection phase, so as to detect whether a peer device connected to the first power supply channel 2012-1 is a valid PD. The control switch MOSFET1 is turned off in the detection phase.

The detection module D2 is configured to send a second detection signal to the second power supply channel 2012-2 in the detection phase, so as to detect whether a peer device connected to the second power supply channel 2012-2 is a valid PD. The control switch MOSFET2 is turned off in the detection phase.

As shown in FIG. 3, the adaptive filter circuit 202 includes two input terminals (2021-1 and 2021-2) and two output terminals (2022-1 and 2022-2). The input terminal 2021-1 of the adaptive filter circuit 202 is connected to an output terminal of the detection module D1, and the input terminal 2021-2 of the adaptive filter circuit 202 is connected to an output terminal of the detection module D2. The output terminal 2022-1 of the adaptive filter circuit 202 is connected to an output terminal of the first power supply channel 2012-1, and the output terminal 2022-2 of the adaptive filter circuit 202 is connected to an output terminal of the second power supply channel 2012-2.

The adaptive filter circuit 202 includes two filters, that is, a filter F1 and a filter F2. The filter F1 is connected in series between the input terminal 2021-1 and the output terminal 2022-1 of the adaptive filter circuit 202. A first terminal f11 of the filter F1 is connected to the input terminal 2021-1 of the adaptive filter circuit 202, and a second terminal f12 of the filter F1 is connected to the output terminal 2022-1 of the adaptive filter circuit 202. The filter F2 is connected in series between the input terminal 2021-2 and the output terminal 2022-2 of the adaptive filter circuit 202. A first terminal f21 of the filter F2 is connected to the input terminal 2021-2 of the adaptive filter circuit 202, and a second terminal f22 of the filter F2 is connected to the output terminal 2022-2 of the adaptive filter circuit 202.

In the filtering-based power supply apparatus 200 shown in FIG. 3, one filter is configured for each power supply channel. The filter is connected in series between a detection module and an output terminal of the power supply channel, and is configured to filter noise in a detection signal on the power supply channel in a detection process, to ensure accuracy of a detection result.

Figure 4:
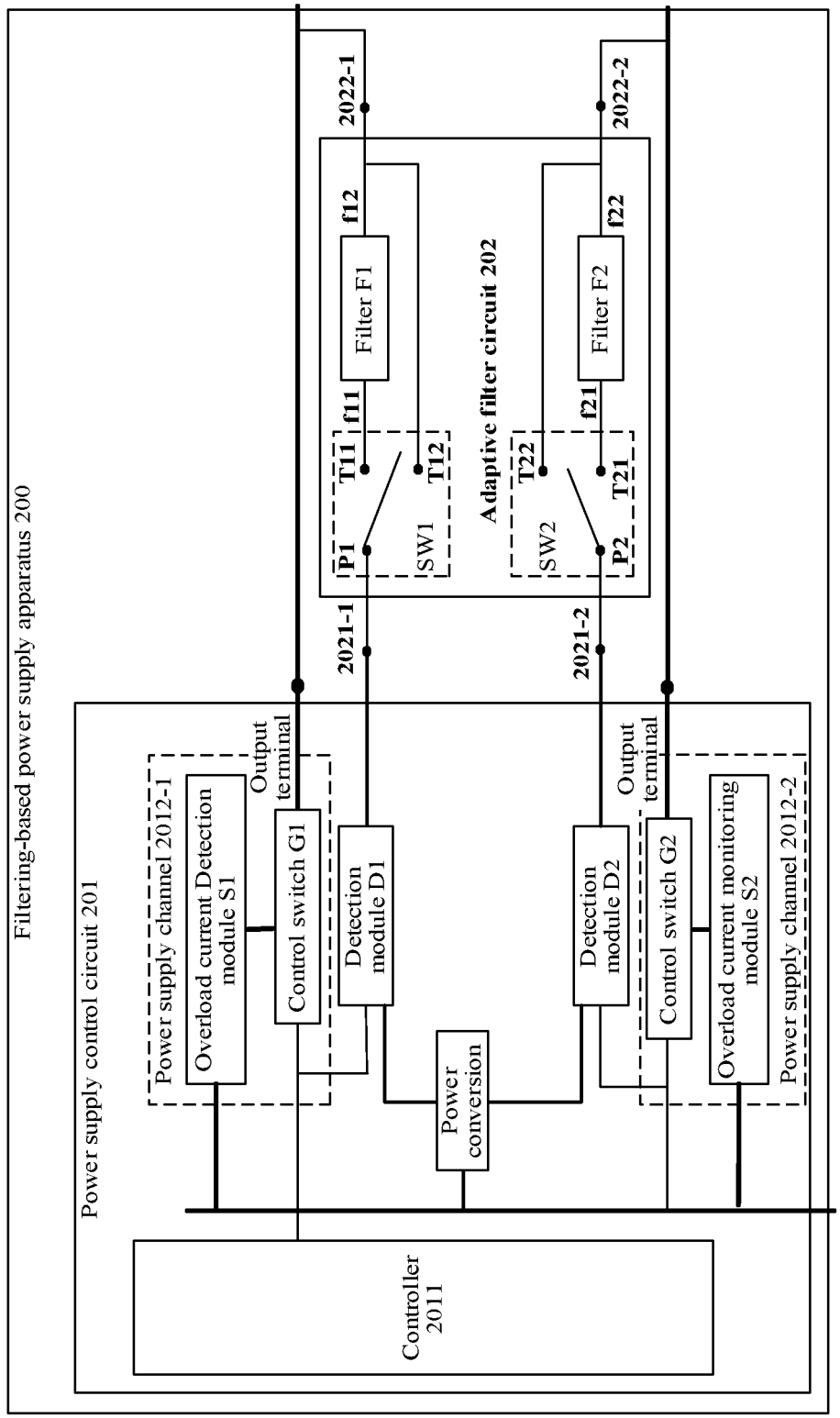
FIG. 4 is a schematic diagram of a structure of still another filtering-based power supply apparatus according to an embodiment of this disclosure.

Optionally, whether to filter the noise in the detection signal on the power supply channel by using the filter may be freely selected. Refer to FIG. 4. The adaptive filter circuit 202 further includes two selector switches which are respectively a first selector switch SW1 and a second selector switch SW2. The first selector switch SW1 and the second selector switch SW2 are each a single pole double throw switch, and may be implemented by using a MOSFET, a relay, an optical coupler, a transistor, and the like. FIG. 4 is only a schematic diagram of the first selector switch SW1 and the second selector switch SW2.

A pole terminal P1 of the first selector switch SW1 is connected to the input terminal 2021-1 of the adaptive filter circuit 202 (that is, connected to the output terminal of the detection module D1), a first throw terminal T11 of the first selector switch SW1 is connected to the first terminal f11 of the filter F1, a second throw terminal T12 of the first selector switch SW1 is connected to the output terminal 2022-1 of the adaptive filter circuit 202, and the second terminal f12 of the filter F1 is connected to the output terminal 2022-1 of the adaptive filter circuit 202. A pole terminal P2 of the second selector switch SW2 is connected to the input terminal 2021-2 of the adaptive filter circuit 202 (that is, connected to the output terminal of the detection module D2), a first throw terminal T21 of the second selector switch SW2 is connected to the first terminal f21 of the filter F2, a second throw terminal T22 of the second selector switch SW2 is connected to the output terminal 2022-2 of the adaptive filter circuit 202, and the second terminal f22 of the filter F2 is connected to the output terminal 2022-2 of the adaptive filter circuit 202.

If the pole terminal P1 of the first selector switch SW1 turns on the first throw terminal T11, it indicates that common mode noise of the first power supply channel 2012-1 (noise in the first detection signal) is filtered by using the filter F1 in a detection process of the first power supply channel 2012-1. If the pole terminal P1 of the first selector switch SW1 turns on the second throw terminal T12, it indicates that the filter F1 is not used in the detection process of the first power supply channel 2012-1. The first selector switch SW1 turns on the detection module D1 and the filter F1 based on a first control instruction sent by the controller 2011, so that the filter F1 filters the common mode noise of the first power supply channel in the detection process (the noise in the first detection signal); or the first selector switch SW1 turns on the detection module D1 and the output terminal of the first power supply channel based on a second control instruction sent by the controller 2011.

If the pole terminal P2 of the second selector switch SW2 turns on the first throw terminal T21, it indicates that noise in the second detection signal is filtered by using the filter F2 in a detection process of the second power supply channel 2012-2. If the pole terminal P2 of the second selector switch SW2 turns on the second throw terminal T22, it indicates that the filter F2 is not used in the detection process of the second power supply channel 2012-2. The second selector switch SW2 turns on the detection module D2 and the filter F2 based on the first control instruction sent by the controller 2011, so that the filter F2 filters common mode noise of the second power supply channel in the detection process (the noise in the second detection signal); or the second selector switch SW2 turns on the detection module D2 and the output terminal of the second power supply channel based on the second control instruction sent by the controller 2011.

In the filtering-based power supply apparatus 200 shown in FIG. 4, one filter is configured for each power supply channel. However, by controlling a selector switch, a common mode interference signal on the power supply channel may be filtered by using a filter, or a common mode interference signal on the power supply channel may be filtered without using a filter. The switch may be controlled according to a customer requirement, an application scenario, or an actual environment in which the filtering-based power supply apparatus 200 is disposed.

In FIG. 3 and FIG. 4, the filtering-based power supply apparatus 200 including two power supply channels is used as an example. In an implementation, the filtering-based power supply apparatus 200 may include N power supply channels, where N≥1. Correspondingly, the adaptive filter circuit includes N filters. If a selector switch is further disposed, N selector switches are included.

Figure 5:
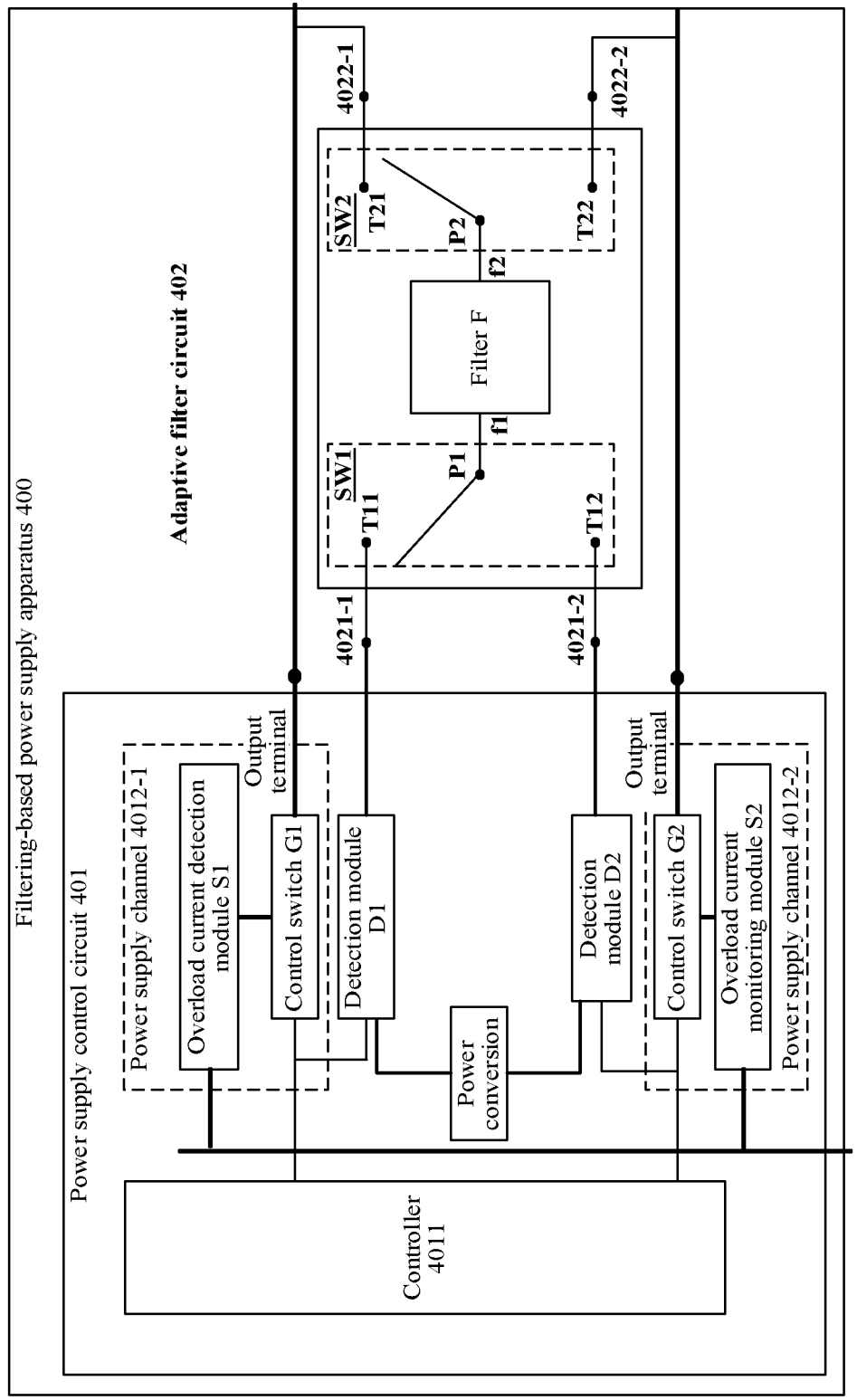
FIG. 5 is a schematic diagram of a structure of yet another filtering-based power supply apparatus according to an embodiment of this disclosure.

FIG. 5 is a schematic diagram of a structure of still another filtering-based power supply apparatus according to an embodiment of this disclosure. As shown in FIG. 5, a filtering-based power supply apparatus 400 includes a power supply control circuit 401 and an adaptive filter circuit 402. The power supply control circuit 401 includes a controller 4011, a first power supply channel 4012-1, a second power supply channel 4012-2, a detection module D1, and a detection module D2. The first power supply channel 4012-1 includes an overload current detection module S1 and a control switch G1, and the second power supply channel 4012-2 includes an overload current detection module S2 and a control switch G2.

The detection module D1 is configured to send a first detection signal to the first power supply channel 4012-1 in a detection phase, so as to detect whether a peer device connected to the first power supply channel 2012-1 is a valid PD. The control switch G1 is turned off in the detection phase.

The detection module D2 is configured to send a second detection signal to the second power supply channel 4012-2 in the detection phase, so as to detect whether a peer device connected to the second power supply channel 2012-2 is a valid PD. The control switch G2 is turned off in the detection phase.

As shown in FIG. 5, the adaptive filter circuit 402 includes two input terminals (4021-1 and 4021-2) and two output terminals (4022-1 and 4022-2). The input terminal 4021-1 of the adaptive filter circuit 402 is connected to an output terminal of the detection module D1, and the input terminal 4021-2 of the adaptive filter circuit 402 is connected to an output terminal of the detection module D2. The output terminal 4022-1 of the adaptive filter circuit 402 is connected to an output terminal of the first power supply channel 4012-1, and the output terminal 4022-2 is connected to an output terminal of the second power supply channel 4012-2.

The adaptive filter circuit 402 includes a common filter and a common selector switch. As shown in FIG. 5, the common filter is a filter F, and the common selector switch is implemented by using a first selector switch SW1 and a second selector switch SW2. The first selector switch SW1, the filter F, and the second selector switch SW2 are connected in series between an input terminal and an output terminal of the adaptive filter circuit 402.

The first selector switch SW1 and the second selector switch SW2 in FIG. 5 are only examples. Both the first selector switch SW1 and the second selector switch SW2 are single pole double throw switches. The first selector switch SW1 and the second selector switch SW2 are controlled based on a uniform rule, that is, the first selector switch SW1 and the second selector switch SW2 are two linked single pole double throw switches. Therefore, the first selector switch SW1 and the second selector switch SW2 may also be understood as one double pole double throw switch. The double pole double throw switch can also be implemented by using a MOSFET, a relay, an optical coupler, a transistor, and the like.

As shown in FIG. 5, a first terminal f1 of the filter F is connected to a pole terminal P1 of the first selector switch SW1, and a second terminal f2 of the filter F is connected to a pole terminal P2 of the second selector switch SW2. Two throw terminals T11 and T12 of the first selector switch SW1 are respectively connected to the input terminal 4021-1 and the input terminal 4021-2 of the adaptive filter circuit 402. Two throw terminals T21 and T22 of the second selector switch SW2 are respectively connected to the output terminal 4022-1 and the output terminal 4022-2 of the adaptive filter circuit 402.

Refer to FIG. 5. When P1 is connected to T11 (that is, the first terminal f1 of the filter F is connected to the output terminal of the detection module D1), P2 is linked to connect to T21 (that is, the second terminal f2 of the filter F is connected to the output terminal of the first power supply channel 4012-1), so that the detection module D1 is connected to the first power supply channel 4012-1 by using the filter F, and common mode noise on the first power supply channel 4012-1 (noise in the first detection signal) can be filtered by using the filter F. When P1 is connected to T12 (that is, the first terminal f1 of the filter F is connected to the output terminal of the detection module D2), P2 is linked to connect to T22 (that is, the second terminal f2 of the filter F is connected to the output terminal of the second power supply channel 4012-2), so that the detection module D2 is connected to the second power supply channel 4012-2 by using the filter F, and common mode noise on the second power supply channel 4012-2 (noise in the second detection signal) can be filtered by using the filter F.

The common selector switches (the first selector switch SW1 and the second selector switch SW2) may turn on the detection module D1, the filter F, and an output terminal of the first power supply channel 4012-1 based on a first selection instruction sent by the controller 4011, so that the detection module D1 filters common mode noise of the first power supply channel 4012-1 by using the filter F in a detection process. After the first power supply channel 4012-1 completes detection, the controller 4011 sends a second selection instruction to the common selector switches (the first selector switch SW1 and the second selector switch SW2), so that the first selector switch SW1 and the second selector switch SW2 turn on the detection module D2, the filter F, and an output terminal of the second power supply channel 4012-2, so that the detection module D2 filters common mode noise of the second power supply channel 4012-2 by using the filter F in a detection process.

In the filtering-based power supply apparatus 400 shown in FIG. 5, two power supply channels sharing one filter is used as an example. In an implementation, N power supply channels may share one filter, where N≥2. Correspondingly, the first selector switch SW1 and the second selector switch SW2 are single pole multiple throw switches, and quantities of throw terminals of the first selector switch SW1 and the second selector switch SW2 are both consistent with a quantity of filters, that is, the quantities of throw terminals of the first selector switch SW1 and the second selector switch SW2 are both N. The first selector switch SW1 and the second selector switch SW2 may sequentially turn on the N power supply channels under an instruction of the controller, and sequentially filter, by using the filter F, common mode noise on the power supply channels in a detection process.

In the filtering-based power supply apparatus 400 shown in FIG. 5, a plurality of power supply channels share one filter. The filter is switched for use between the plurality of power supply channels by the control switch, to filter common mode interference signals on the power supply channels. For example, in FIG. 5, when the first power supply channel 4012-1 needs to be detected, the first selector switch SW1 and the second selector switch SW2 are controlled to turn on the detection module D1 and the first power supply channel 4012-1 by using the filter F, to filter the noise in the first detection signal by using the filter F. When the second power supply channel 4012-2 needs to be detected, the first selector switch SW1 and the second selector switch SW2 are controlled to turn on the detection module D2 and the second power supply channel 4012-2 by using the filter F, to filter the noise in the second detection signal by using the filter F. In the filtering-based power supply apparatus 400 shown in FIG. 5, the plurality of power supply channels sharing one filter can reduce costs.

Certainly, in the filtering-based power supply apparatus 400 shown in FIG. 5, a selector switch may be further designed to choose to use or not to use a filter to filter a detection signal.

In the foregoing filtering-based power supply apparatuses shown in FIG. 1 to FIG. 5, an adaptive filter circuit is disposed between a detection module and a power supply port.

Figure 6:
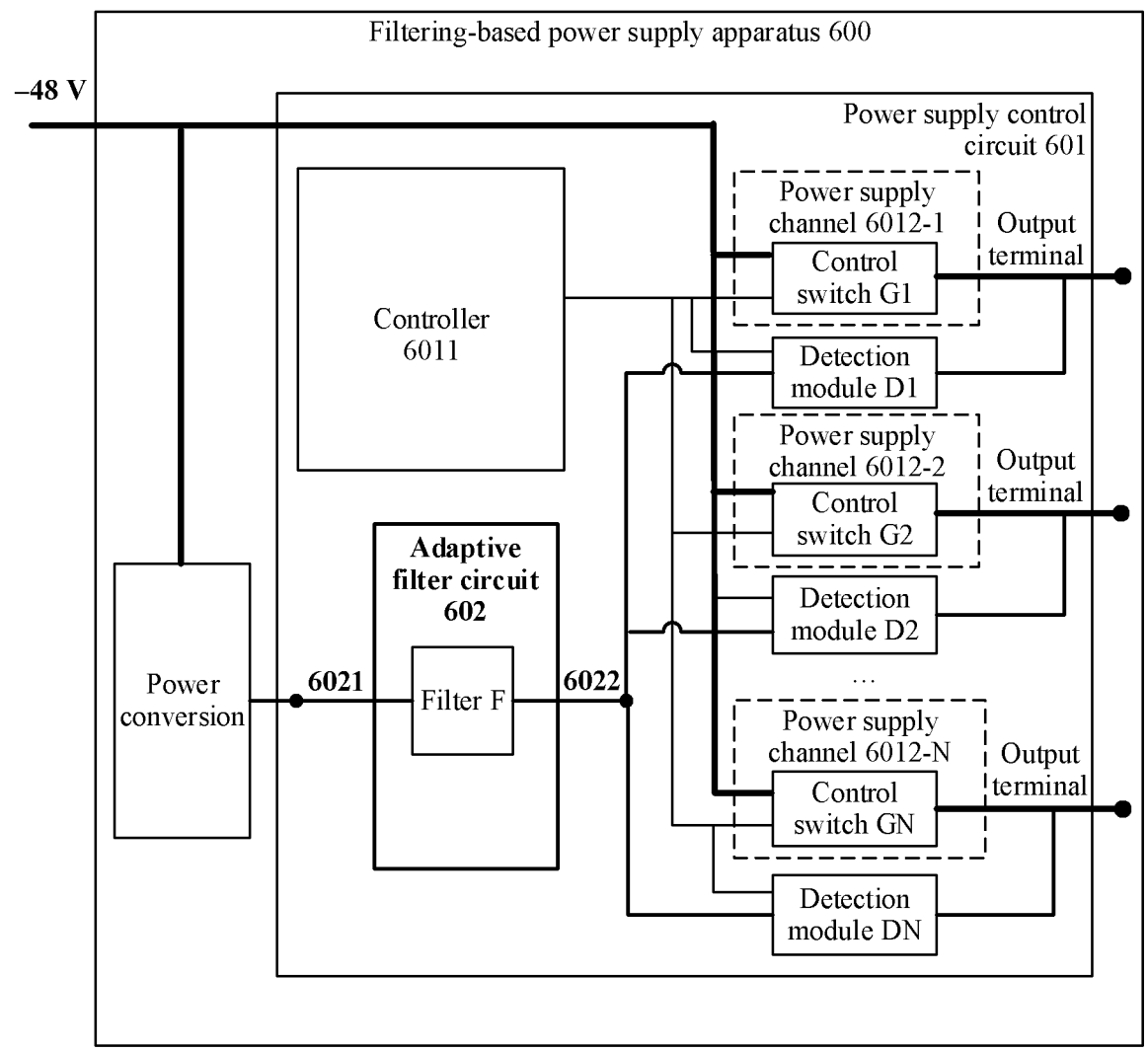
FIG. 6 is a schematic diagram of a structure of still yet another filtering-based power supply apparatus according to an embodiment of this disclosure.

FIG. 6 is a schematic diagram of a structure of still another filtering-based power supply apparatus according to an embodiment of this disclosure. A difference from the foregoing filtering-based power supply apparatuses shown in FIG. 1 to FIG. 5 is that, in a filtering-based power supply apparatus 600 shown in FIG. 6, an adaptive filter circuit is disposed before a detection module, and connected in series between a power conversion module and the detection module.

As shown in FIG. 6, the filtering-based power supply apparatus 600 includes a power supply control circuit 601 and an adaptive filter circuit 602.

The power supply control circuit 601 includes a controller 6011, N power supply channels (6012-1 to 6012-N), and N detection modules, where N is a positive integer. Each power supply channel corresponds to one detection module. Each power supply channel includes one control switch. The control switch is configured to turn on or turn off a power supply channel in which the control switch is located. A control switch in each power supply channel is in an off state in a detection process of the power supply channel.

Figure 7:
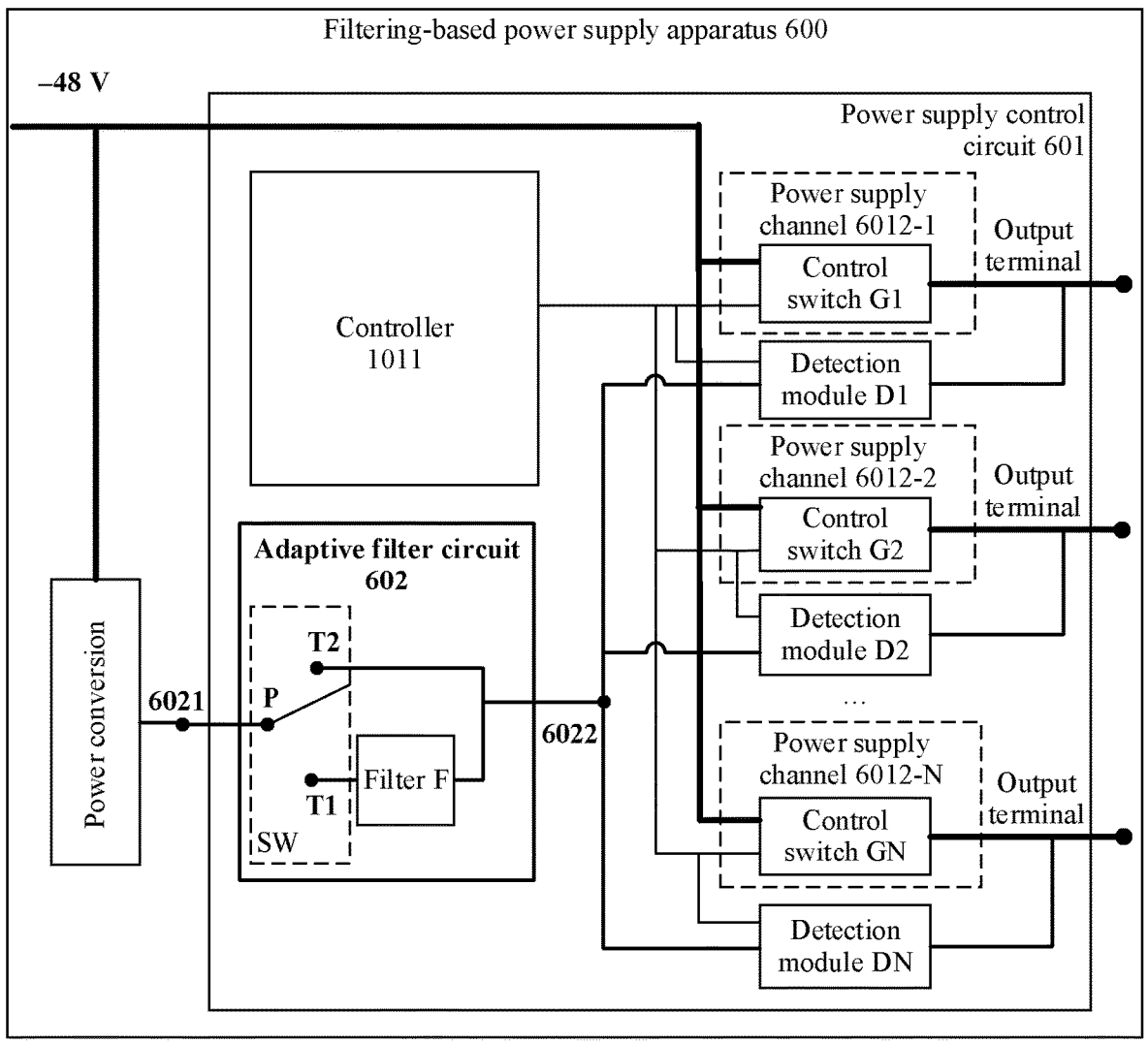
FIG. 7 is a schematic diagram of a structure of a further filtering-based power supply apparatus according to an embodiment of this disclosure.

The adaptive filter circuit 602 includes an input terminal 6021 and an output terminal 6022. The adaptive filter circuit 602 includes a filter F configured to filter common mode noise from a power supply, so as to filter noise in a detection signal. The filter F is connected in series between the input terminal 6021 and the output terminal 6022. The input terminal 6021 of the adaptive filter circuit 602 is connected to the power conversion module, and the output terminal 6022 of the adaptive filter circuit 602 is connected to input terminals of the N detection modules. The adaptive filter circuit 602 shown in FIG. 6 can filter noise in the power supply input to the detection module, to filter the noise in the detection signal from a source. Optionally, in the filtering-based power supply apparatus 600 shown in FIG. 7, the adaptive filter circuit 602 further includes a selector switch SW, configured to select to filter the common mode noise from the power supply with or without the filter F. The selector switch SW is a single pole double throw switch, and the selector switch SW in FIG. 7 is only an example. In an implementation, the selector switch SW may alternatively be implemented by using a MOSFET, a relay, an optical coupler, a transistor, and the like.

A pole terminal P of the selector switch SW is connected to the input terminal 6021 of the adaptive filter circuit 602 (that is, connected to an output terminal of the power conversion module), a first throw terminal T1 of the selector switch SW is connected to a first terminal f1 of the filter F, a second throw terminal T2 of the selector switch SW is connected to the output terminal 6022 of the adaptive filter circuit 602, and a second terminal f2 of the filter F is connected to the output terminal 6022 of the adaptive filter circuit 602.

If the pole terminal P of the selector switch SW turns on the first throw terminal T1, it indicates that a common mode interference signal from the power supply is filtered by using the filter F. If the pole terminal P of the selector switch SW turns on the second throw terminal T2, it indicates that the common mode noise from the power supply is filtered without using the filter F. The selector switch SW turns on the power conversion module, the filter F, and input terminals of the N detection modules based on a first control instruction sent by the controller 6011, to filter the common mode noise from the power supply by using the filter F; or the selector switch SW turns on the power conversion module and input terminals of the N detection modules based on a second control instruction sent by the controller 6011. In this way, the filter F is not used to filter the common mode noise from the power supply.

Figure 8:
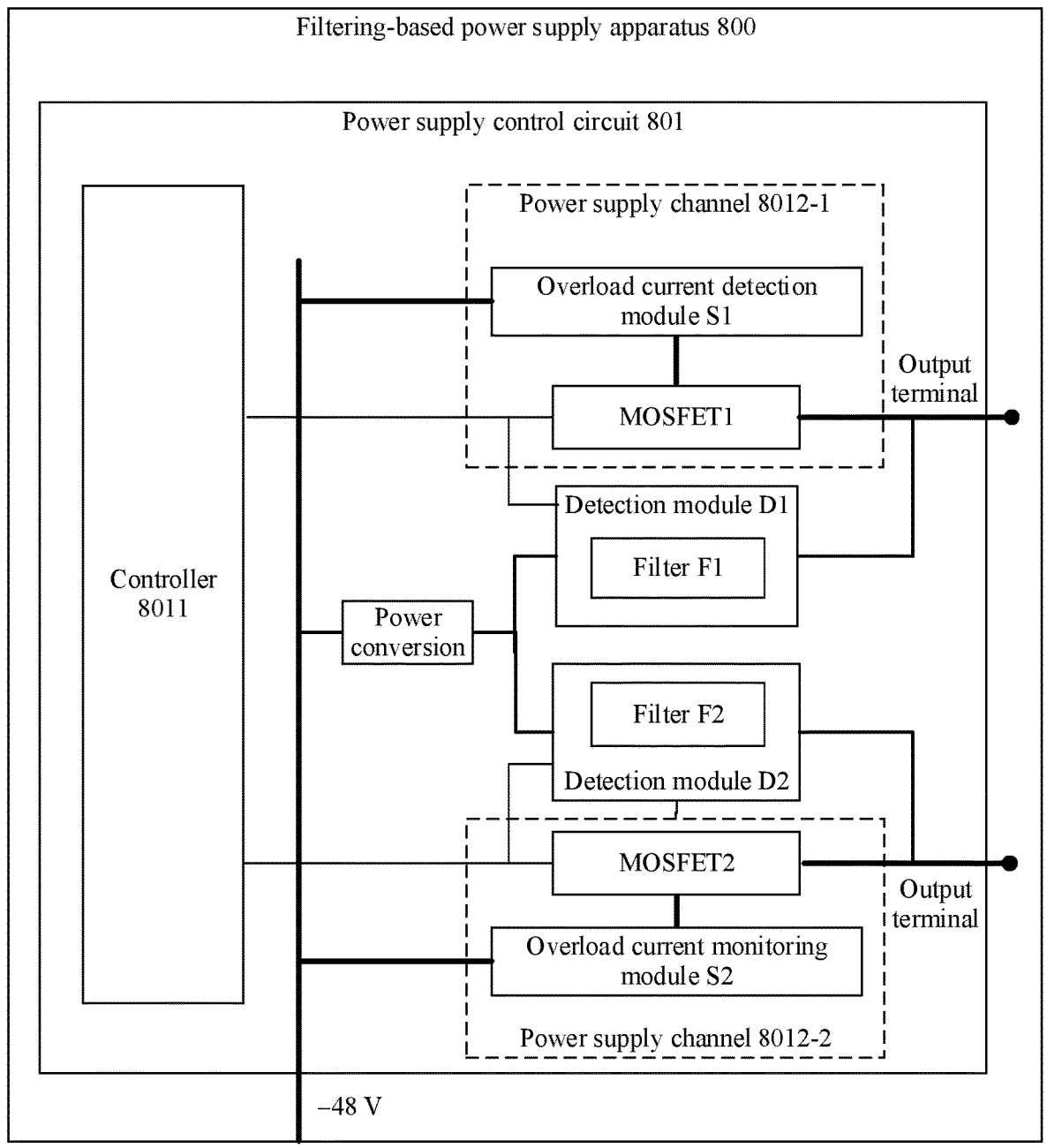
FIG. 8 is a schematic diagram of a structure of a still further filtering-based power supply apparatus according to an embodiment of this disclosure.

FIG. 8 is a schematic diagram of a structure of yet another f filtering-based power supply apparatus according to an embodiment of this disclosure. A difference from the foregoing filtering-based power supply apparatuses shown in FIG. 1 to FIG. 5 is that, in a filtering-based power supply apparatus 800 shown in FIG. 8, an adaptive filter circuit is disposed in a detection module.

As shown in FIG. 8, each detection module includes one filter, configured to filter noise in a detection signal. The filter in each detection module is a part of the adaptive filter circuit.

Optionally, on the basis of FIG. 8, each detection module further includes a selector switch, configured to select whether to filter the noise in the detection signal by using the filter. The selector switch is a single pole double throw switch, and may be implemented by using a MOSFET, a relay, an optical coupler, a transistor, and the like. In this implementation, the filter and the selector switch in each detection module are parts of the adaptive filter circuit.

According to embodiments of this disclosure, in the filtering-based power supply apparatuses shown in FIG. 1 to FIG. 8, that N power supply channels share one controller is only an example, and this imposes no limitation on this disclosure. In an implementation, each power supply channel may alternatively correspond to one channel controller. In this case, it may be considered that channel controllers corresponding to all power supply channels are integrated into the controllers shown in FIG. 1 to FIG. 8.

Figure 9:
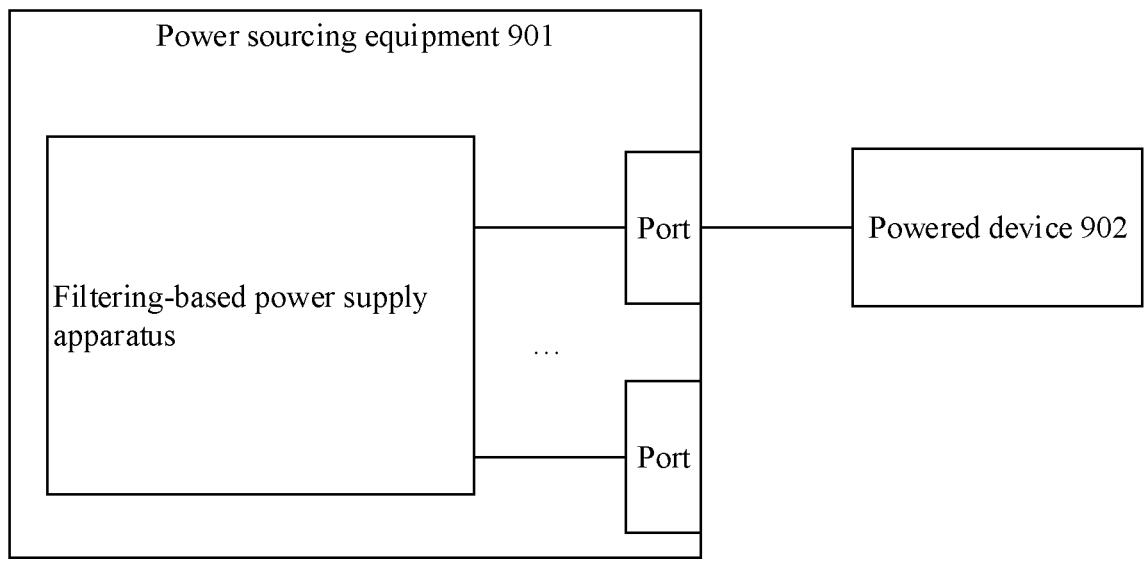
FIG. 9 is a schematic diagram of a structure of a power supply system according to an embodiment of this disclosure.

FIG. 9 is a schematic diagram of a structure of a power supply system according to an embodiment of this disclosure. The power supply system includes a PSE 901 and a powered device 902. The PSE 901 includes at least one power supply port. The at least one power supply port may be connected to the powered device 902, and may perform noise filtering detection on the powered device 902, to ensure an accurate detection result. The PSE 901 includes the filtering-based power supply apparatus shown in any one of FIG. 1 to FIG. 8.

In this embodiment of this disclosure, PoE is used as an example for description. A scenario in which a similar power supply technology is used, for example, Power over Data lines (PoDL), is also applicable. In the PoDL scenario, a person skilled in the art may make adaptive modifications, variations, or replacements of different protocols based on embodiments of this disclosure, and these shall also fall within the protection scope of this disclosure.

A person of ordinary skill in the art may understand that all or some of the steps of the method embodiments may be implemented by a program instructing related hardware. The program may be stored in a computer readable storage medium. The storage medium may be a random-access memory (RAM), a read-only memory, a flash memory, a hard disk, a solid state drive, an optical disc, or the like.

The foregoing descriptions are merely example implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An apparatus, comprising:
   a power supply control circuit comprising:
      a first power supply channel comprising a first control switch, wherein the first control switch is configured to turn the first power supply channel on and off, and wherein the first control switch turns the first power supply channel off in a first detection process of the first power supply channel; and
      a first detection module configured to send a first detection signal to the first power supply channel to detect whether a first peer device coupled to the first power supply channel is a first valid powered device, wherein the first detection signal comprises common mode interference noise from a power supply; and
   an adaptive filter circuit coupled to the power supply control circuit and configured to filter, based on a first control instruction output by the power supply control circuit, the common mode interference noise from the first detection module in the first detection signal in the first detection process of the first power supply channel.

2. The apparatus of claim 1, wherein the adaptive filter circuit comprises a first filter, a first input terminal, and a first output terminal, wherein the first filter is coupled in series between the first input terminal and the first output terminal, and wherein the first filter is configured to filter the common mode interference noise in the first detection signal in the first detection process.

3. The apparatus of claim 2, wherein the adaptive filter circuit further comprises a first selector switch, and wherein the first selector switch is configured to turn, based on the first control instruction, the first input terminal, the first filter, and the first output terminal on to filter the common mode interference noise in the first detection signal using the first filter.

4. The apparatus of claim 3, wherein the power supply control circuit further comprises a controller, and wherein the controller is configured to send the first control instruction to the first selector switch.

5. The apparatus of claim 2, wherein the first input terminal is coupled to a second output terminal of the first detection module, and the first output terminal is coupled to a third output terminal of the first power supply channel, wherein the first input terminal is coupled to a power supply, and the first output terminal is coupled to a second input terminal of the first detection module, or wherein the adaptive filter circuit is located in the first detection module.

6. The apparatus of claim 1, wherein the power supply control circuit further comprises a second power supply channel and a second detection module, wherein the second power supply channel comprises a second control switch, wherein the second control switch is configured to turn the second power supply channel on and off, wherein the second detection module is configured to send a second detection signal to the second power supply channel to detect whether a second peer device coupled to the second power supply channel is a second valid powered device, wherein the adaptive filter circuit is further configured to filter the common mode interference noise in the second detection signal in a second detection process of the second power supply channel, and wherein the second control switch is turned off in the second detection process.

7. The apparatus of claim 6, wherein the adaptive filter circuit comprises a first filter and a second filter, wherein the first filter corresponds to the first power supply channel, wherein the second filter corresponds to the second power supply channel, wherein the first filter is coupled in series between a first input terminal and a first output terminal of the adaptive filter circuit, wherein the second filter is coupled in series between a second input terminal and a second output terminal of the adaptive filter circuit, wherein the first filter is configured to filter the common mode interference noise in the first detection signal in the first detection process of the first power supply channel, and wherein the second filter is configured to filter the common mode interference noise in the second detection signal in the second detection process.

8. The apparatus of claim 7, wherein the adaptive filter circuit further comprises a first selector switch and a second selector switch, wherein the first selector switch is configured to turn, based on the first control instruction, the first input terminal, the first filter, and the first output terminal on to filter the common mode interference noise in the first detection signal using the first filter, and wherein the second selector switch is configured to turn, based on the first control instruction, the second input terminal, the second filter, and the second output terminal on to filter the common mode interference noise in the second detection signal using the second filter.

9. The apparatus of claim 6, wherein the adaptive filter circuit comprises a common filter and a common selector switch, wherein a first input terminal of the adaptive filter circuit is coupled to a first output terminal of the first detection module, wherein a second output terminal of the adaptive filter circuit is coupled to a third output terminal of the first power supply channel, wherein a second input terminal of the adaptive filter circuit is coupled to a fourth output terminal of the second detection module, wherein a fifth output terminal of the adaptive filter circuit is coupled to a sixth output terminal of the second power supply channel, wherein the common selector switch is configured to turn, based on a first selection instruction, the first detection module, the common filter, and a seventh output terminal of the first power supply channel on to filter the common mode interference noise in the first detection signal using the common filter, wherein the common selector switch is further configured to turn, based on a second selection instruction, the second detection module, the common filter, and an eighth output terminal on to filter the common mode interference noise in the second detection signal using the common filter, wherein the power supply control circuit further comprises a controller, and wherein the controller is configured to send the first selection instruction to the common selector switch.

10. The apparatus of claim 1, wherein the adaptive filter circuit is further configured to skip, based on a second control instruction output by the power supply control circuit, filtering the common mode interference noise from the first detection module in the first detection signal in the first detection process of the first power supply channel.

11. An apparatus, comprising:
at least one port; and
a filtering-based power supply apparatus configured to perform detection on the at least one port, wherein the filtering-based power supply apparatus comprises:
  a power supply control circuit comprising:
    a first power supply channel comprising a first control switch, wherein the first control switch is configured to turn the first power supply channel on and off, and wherein the first control switch turns the first power supply channel off in a first detection process of the first power supply channel; and
    a first detection module configured to send a first detection signal to the first power supply channel to detect whether a first peer device coupled to the first power supply channel is a first valid powered device, wherein the first detection signal comprises common mode interference noise from a power supply; and
  an adaptive filter circuit coupled to the power supply control circuit and first configured to filter, based on a first control instruction output by the power supply control circuit, the common mode interference noise from the first detection module in the first detection signal in the first detection process of the first power supply channel.

12. The apparatus of claim 11, wherein the adaptive filter circuit comprises a first filter, a first input terminal, and a first output terminal, wherein the first filter is coupled in series between the first input terminal and the first output terminal, and wherein the first filter is configured to filter the common mode interference noise in the first detection signal in the first detection process.

13. The apparatus of claim 12, wherein the adaptive filter circuit further comprises a first selector switch, and wherein the first selector switch is configured to turn, based on the first control instruction, the first input terminal, the first filter, and the first output terminal on to filter the common mode interference noise in the first detection signal using the first filter.

14. The apparatus of claim 13, wherein the power supply control circuit further comprises a controller, and wherein the controller is configured to send the first control instruction to the first selector switch.

15. The apparatus of claim 12, wherein the first input terminal is coupled to a second output terminal of the first detection module, and the first output terminal is coupled to a third output terminal of the first power supply channel, wherein the first input terminal is coupled to a power supply, and the first output terminal is coupled to a second input terminal of the first detection module, or wherein the adaptive filter circuit is located in the first detection module.

16. The apparatus of claim 11, wherein the power supply control circuit further comprises a second power supply channel and a second detection module, wherein the second power supply channel comprises a second control switch, wherein the second control switch is configured to turn the second power supply channel on and off, wherein the second detection module is configured to send a second detection signal to the second power supply channel to detect whether a second peer device coupled to the second power supply channel is a second valid powered device, wherein the adaptive filter circuit is further configured to filter the common mode interference noise in the second detection signal in a second detection process of the second power supply channel, and wherein the second control switch is turned off in the second detection process.

17. The apparatus of claim 16, wherein the adaptive filter circuit comprises a first filter and a second filter, wherein the first filter corresponds to the first power supply channel, wherein the second filter corresponds to the second power supply channel, wherein the first filter is coupled in series between a first input terminal and a first output terminal of the adaptive filter circuit, wherein the second filter is coupled in series between a second input terminal and a second output terminal of the adaptive filter circuit, wherein the first filter is configured to filter the common mode interference noise in the first detection signal in the first detection process of the first power supply channel, and wherein the second filter is configured to filter the common mode interference noise in the second detection signal in the second detection process.

18. The apparatus of claim 17, wherein the adaptive filter circuit further comprises a first selector switch and a second selector switch, wherein the first selector switch is configured to turn, based on the first control instruction, the first input terminal, the first filter, and the first output terminal on to filter the common mode interference noise in the first detection signal using the first filter, and wherein the second selector switch is configured to turn, based on the first control instruction, the second input terminal, the second filter, and the second output terminal on to filter the common mode interference noise in the second detection signal using the second filter.

19. The apparatus of claim 16, wherein the adaptive filter circuit comprises a common filter and a common selector switch, wherein a first input terminal of the adaptive filter circuit is coupled to a first output terminal of the first detection module, wherein a second output terminal of the adaptive filter circuit is coupled to a third output terminal of the first power supply channel, wherein a second input terminal of the adaptive filter circuit is coupled to a fourth output terminal of the second detection module, wherein a fifth output terminal of the adaptive filter circuit is coupled to a sixth output terminal of the second power supply channel, wherein the common selector switch is configured to turn, based on a first selection instruction, the first detection module, the common filter, and a seventh output terminal of the first power supply channel on to filter the common mode interference noise in the first detection signal using the common filter, and wherein the common selector switch is further configured to turn, based on a second selection instruction, the second detection module, the common filter, and an eighth output terminal on to filter the common mode interference noise in the second detection signal using the common filter.

20. A system, comprising:
a powered device (PD); and
a power sourcing equipment (PSE) coupled to the PD using a twisted pair, wherein the PSE comprises at least one port and a filtering-based power supply apparatus configured to perform detection on the at least one port, and wherein the filtering-based power supply apparatus comprises:
a power supply control circuit comprising:
a first power supply channel comprising a first control switch, wherein the first control switch is configured to turn the first power supply channel on and off, and wherein the first control switch turns the first power supply channel off in a first detection process of the first power supply channel; and
a first detection module configured to send a first detection signal to the first power supply channel to detect whether a first peer device coupled to the first power supply channel is a valid powered device, wherein the first detection signal comprises common mode interference noise from a power supply; and
an adaptive filter circuit coupled to the power supply control circuit and configured to filter, based on a first control instruction output by the power supply control circuit, filter the common mode interference noise from the first detection module in the first detection signal in the first detection process of the first power supply channel.

* * * * *

UNITED STATES PATENT AND TRADEMARK OFFICE
CERTIFICATE OF CORRECTION

PATENT NO. : 12,032,424 B2
APPLICATION NO. : 17/850019
DATED : July 9, 2024
INVENTOR(S) : Shiyong Fu et al.

Page 1 of 1

It is certified that error appears in the above-identified patent and that said Letters Patent is hereby corrected as shown below:

In the Claims

Claim 11, Column 18, Line 58: "control circuit and first configured to filter, based on a" should read "control circuit and configured to filter, based on a"

Signed and Sealed this
Twenty-fourth Day of September, 2024

Katherine Kelly Vidal
*Director of the United States Patent and Trademark Office*